Sept. 29, 1925.
A. O. HAYES ET AL
THEFT INDICATOR
Filed May 29, 1924
1,555,571
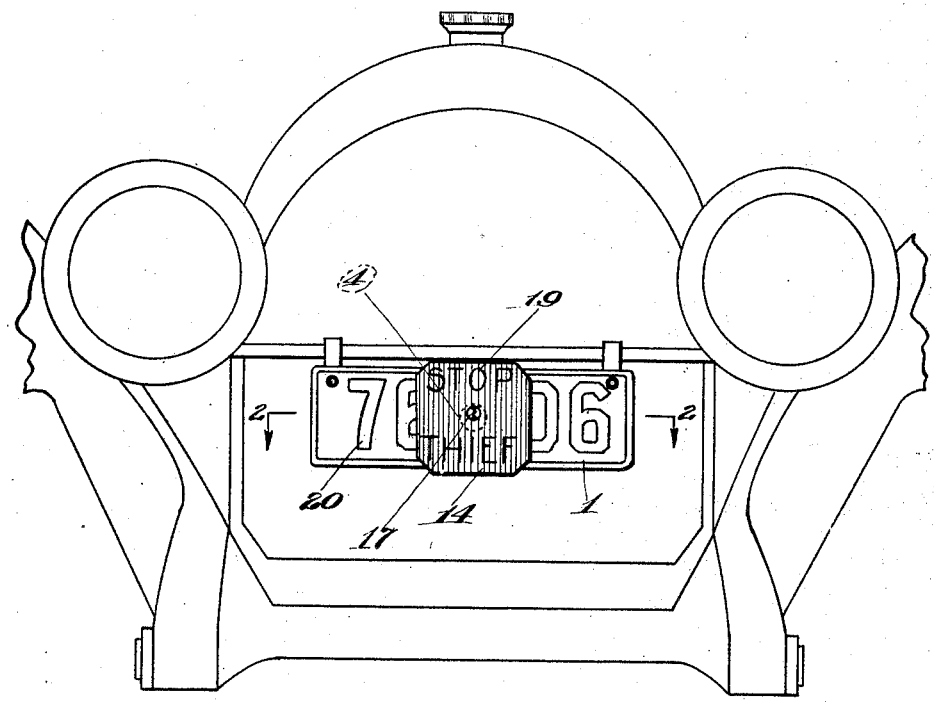
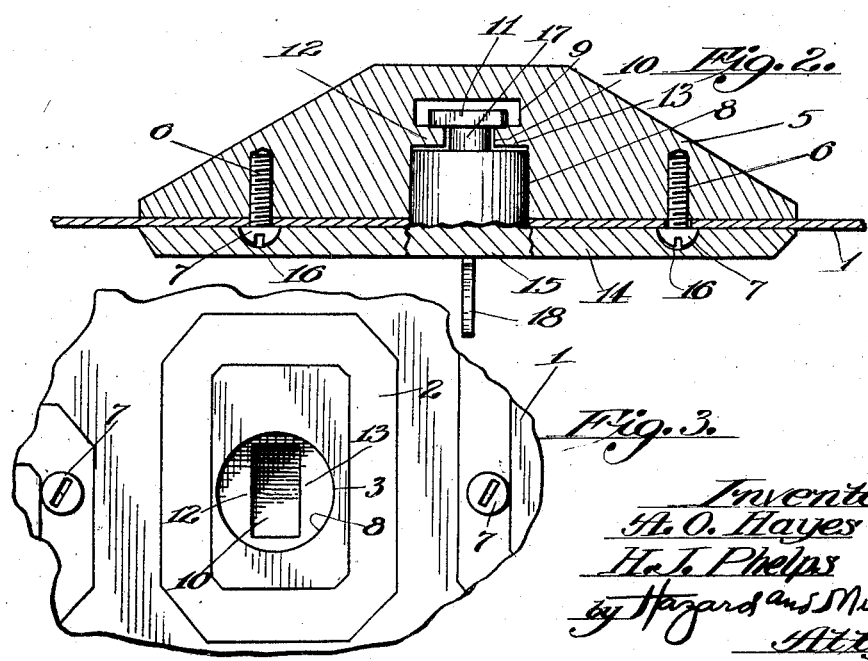

Patented Sept. 29, 1925.

1,555,571

UNITED STATES PATENT OFFICE.

ARCHER O. HAYES AND HERBERT J. PHELPS, OF SAN DIMAS, CALIFORNIA.

THEFT INDICATOR.

Application filed May 29, 1924. Serial No. 716,738.

*To all whom it may concern:*

Be it known that we, ARCHER O. HAYES and HERBERT J. PHELPS, citizens of the United States, residing at San Dimas, in the county of Los Angeles and State of California, have invented new and useful Improvements in Theft Indicators, of which the following is a specification.

This invention is a theft indicator for motor vehicles and consists of the novel features herein shown, described and claimed.

An object is to make a theft indicator to be locked over the front license plate of a motor vehicle so that when the motor vehicle is operated with the indicator in place anyone noticing the indicator will know that the motor vehicle is being stolen.

Other objects and advantages will appear from the drawings and specification.

The drawings illustrate the construction and use of a theft indicator for motor vehicles embodying the principles of the invention.

Figure 1 is a fragmentary front elevation of a motor vehicle with the theft indicator in position for use.

Fig. 2 is a horizontal sectional detail upon an enlarged scale and taken on the line 2—2 of Fig. 1 and looking downwardly as indicated by the arrows.

Fig. 3 is a fragmentary elevation of the license plate prepared to receive the theft indicator.

The details of construction and operation shown in the drawings are as follows:

The front license plate 1 may be any of the usual constructions and in the construction shown in Fig. 3 has a zero 2 forming one of the characters of the license number and located at the center of the plate. A circular opening 3 is formed through the plate at its center to receive a lock housing 4. A strong heavy block 5 fits against the back side of the license plate 1 and is secured in place by a plurality of screws 6 inserted through the license plate and tapped into the block, these screws preferably having round heads 7 projecting forwardly from the license plate. A chamber 8 is formed from the front or inner face of block 5 in registration with the opening 3 through the license plate 1, and the lock housing 4 fits in the chamber 8.

A button chamber 9 is formed in the block 5 in line with the chamber 8 and a slot 10 connects the chamber 9 to the chamber 8 so that when the button 11 passes through the slot 10 and is turned a quarter revolution, the ends of the button will engage the abutments 12 and 13 at the sides of the slot 10. The lock housing 4 is inserted through a heavy indicator plate 14 until the front end face 15 is flush with the front face of the plate 14, and the housing 4 is secured in place by welding, brazing, or the like, so as to be practically integral with the plate. The plate 14 has recesses 16 formed from its inner face to closely fit the head 7 of the screw 6 so as to hold the plate 14 from rotating with the housing 4 as its pivot.

The rotating lock cylinder 17 is mounted in the housing 4 in the usual way, and the button 11 is welded or otherwise fastened against the rear end face of the cylinder 17, said button being elongated at opposite sides of the cylinder. The housing 4 and cylinder 17 are arranged with the key 18 in place so that when the key 18 is in position to be removed the button 11 will be across the slot 10, and when the key is removed the plate 14 is securely locked against the license plate 1, and so that when the key 18 is inserted and turned a quarter turn the button 11 will pass freely through the slot 10.

Any desired indication 19, such as Stop thief, may be placed upon the face of the plate 14. The plate 14 may be of any desired size and will cover a corresponding amount of the license plate number 20.

The device is to be applied when the motor vehicle is to be parked or left alone and is to be removed when the motor vehicle is being legitimately operated.

Thus we have produced a theft indicator for motor vehicles comprising the combination with a license plate of a theft indicating means adapted to be locked to the license plate.

Various changes may be made without departing from the spirit of the invention as claimed.

We claim:

1. A theft indicator comprising a locking block adapted to be secured to the back of a license plate, an indicator adapted to fit against the front of the license plate, and means for locking the indicator to the block.

2. A theft indicator comprising a license plate, a block fitting against the back of the plate, projecting head screws inserted through the plate into the block, an indicator having recesses to receive the heads, and a lock for connecting the indicator through the plate to the block.

3. A theft indicator comprising a license plate, a locking block adapted to be secured to the back of the license plate having a chamber and a button chamber with abutments between the two chambers, an indicator adapted to fit over the front of the license plate and a lock rigidly attached to the indicator, said lock being adapted to fit in the chamber in the block and have a button in the button chamber engaging the abutments.

In testimony whereof we have signed our names to this specification.

ARCHER O. HAYES.
HERBERT J. PHELPS.